United States Patent [19]

Davis

[11] Patent Number: 4,795,405

[45] Date of Patent: Jan. 3, 1989

[54] STRUCTURAL MEMBER WITH FORWARD GUIDE AND REARWARD MOUNTING COMPONENTS

[76] Inventor: Leonard L. Davis, 1956 Shannon Dr., Mississauga, Ontario, Canada, L5H 3W2

[21] Appl. No.: 85,777

[22] Filed: Aug. 17, 1987

[51] Int. Cl.⁴ .......................... A63J 1/02; F16C 11/10

[52] U.S. Cl. ........................................ 272/23; 272/21; 272/22; 272/24

[58] Field of Search ........................ 272/21, 22, 23, 24; 32/710, 720, 721, 729; 16/96 D, 93 D, 94 D, 95 D, 87.4; 254/269, 270, 283, 286, 316, 394; 411/174

[56] References Cited

U.S. PATENT DOCUMENTS

| | | | |
|---|---|---|---|
| 1,261,775 | 4/1918 | Curran et al. | 272/23 |
| 1,561,126 | 11/1925 | Timm | 52/710 X |
| 2,142,063 | 12/1938 | Tompkins | 272/23 |
| 2,727,272 | 12/1955 | Hankin et al. | 16/93 D |
| 4,134,177 | 1/1979 | Janson | 254/394 |
| 4,166,306 | 9/1979 | Janson | 16/96 D X |

FOREIGN PATENT DOCUMENTS

| | | | |
|---|---|---|---|
| 2746438 | 4/1979 | Fed. Rep. of Germany | 272/21 |
| 2920503 | 12/1980 | Fed. Rep. of Germany | 272/23 |
| 2080904 | 2/1982 | United Kingdom | 411/174 |

*Primary Examiner*—David A. Scherbel
*Assistant Examiner*—Richard E. Chilcot, Jr.

[57] ABSTRACT

The present invention provides a structural member for use in theatrical rigging formed by forward and rearward components integrated with one another. The forward component comprises a counterweight guide and the rearward component comprises a hollow mount with an axially extending undercut slot for slidably receiving securing members to be affixed to a support for the structural member.

2 Claims, 5 Drawing Sheets

FIG.4.
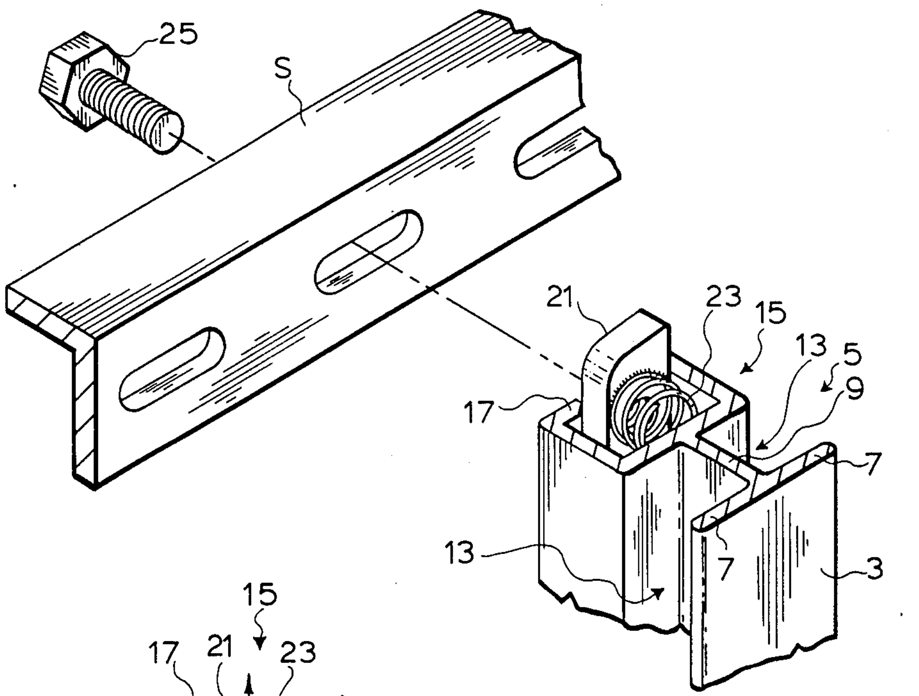
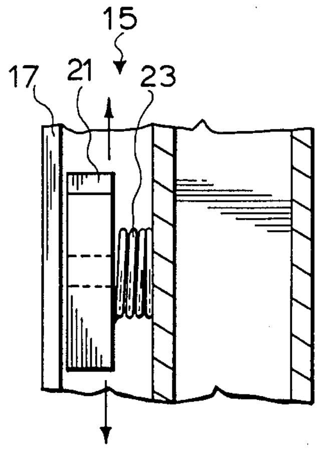
FIG.5.
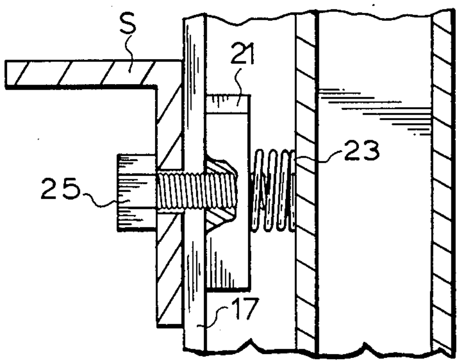
FIG.6.

STRUCTURAL MEMBER WITH FORWARD GUIDE AND REARWARD MOUNTING COMPONENTS

FIELD OF THE INVENTION

The present invention relates to a theatrical rigging counterweight guide.

BACKGROUND OF THE INVENTION

Theatrical rigging includes numerous backdrops which are moved in and out of position by means of counterweights. The guides for these counterweights are typically in the form of elongated upright runners secured in position by spaced apart support rods at right angles to the runners. In accordance with conventional practice, these runners are provided with rear mounting surfaces which must be first set up in position relative to the support rods and then, after being properly positioned, they are drilled where intersecting the support rods for receiving securing bolts or the like.

The mounting arrangement for a standard counterweight guide as described immediately above is extremely labour intensive, particularly when considering that these guides often attain lengths of 60 feet or more, requiring numerous drilling and bolting locations. Accordingly, this standard mounting arrangement is both costly and very time consuming.

SUMMARY OF THE PRESENT INVENTION

The present invention provides a structural member for use in theatrical rigging having both counterweight guide and mounting features. In particular, the structural member of the present invention is formed by integrated forward and rearward components, with the forward component comprising a counterweight guide and the rearward component comprising a hollow mount with an axially extending undercut slot for slidably receiving securing means for securing to a support for the structural member.

In accordance with the present invention, a securing means typically in the form of a nut and bolt combination can quickly and easily be slid along the hollow mount to any desired position for aligning with the support member and eliminating the necessity for pre-set-up and drilling of the structural member.

BRIEF DISCUSSION OF THE DRAWINGS

The above as well as other advantages and features of the present invention will be described in greater detail according to the preferred embodiments of the present invention in which:

FIG. 4 is an enlarged perspective view showing the structural guide and mount member as secured to a support rod;

FIG. 5 is a sectional view through the structural guide and mount member of FIG. 4;

FIG. 6 is a sectional view of the assembled arrangement of FIG. 4; and

DETAILED DESCRIPTION ACCORDING TO THE PREFERRED EMBODIMENTS OF THE PRESENT INVENTION

Figure 1:
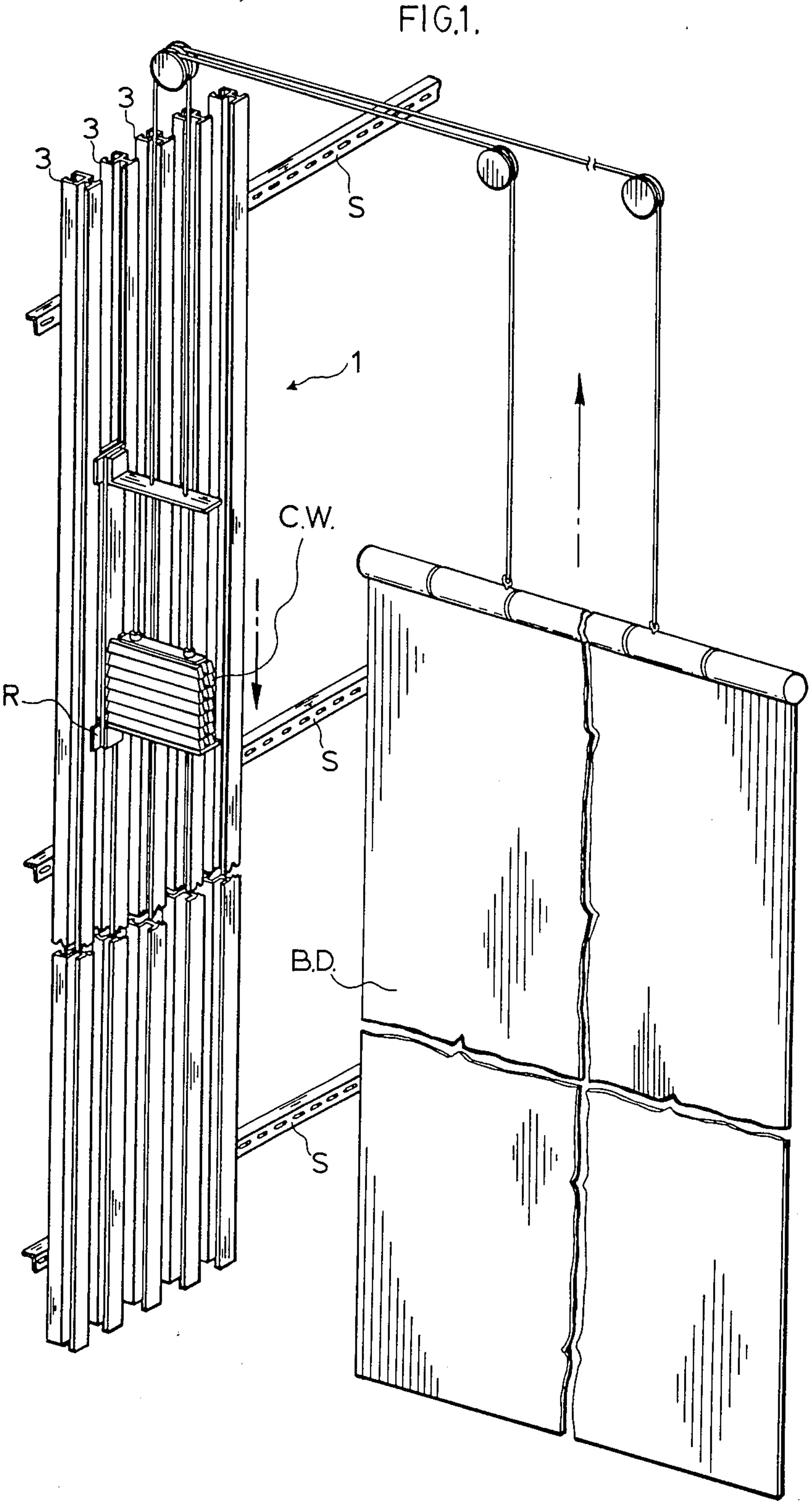
FIG. 1 is a perspective view of a stage backdrop with counterweights fitted to a structural guide and mount member according to a preferred embodiment of the present invention.
Figure 2:
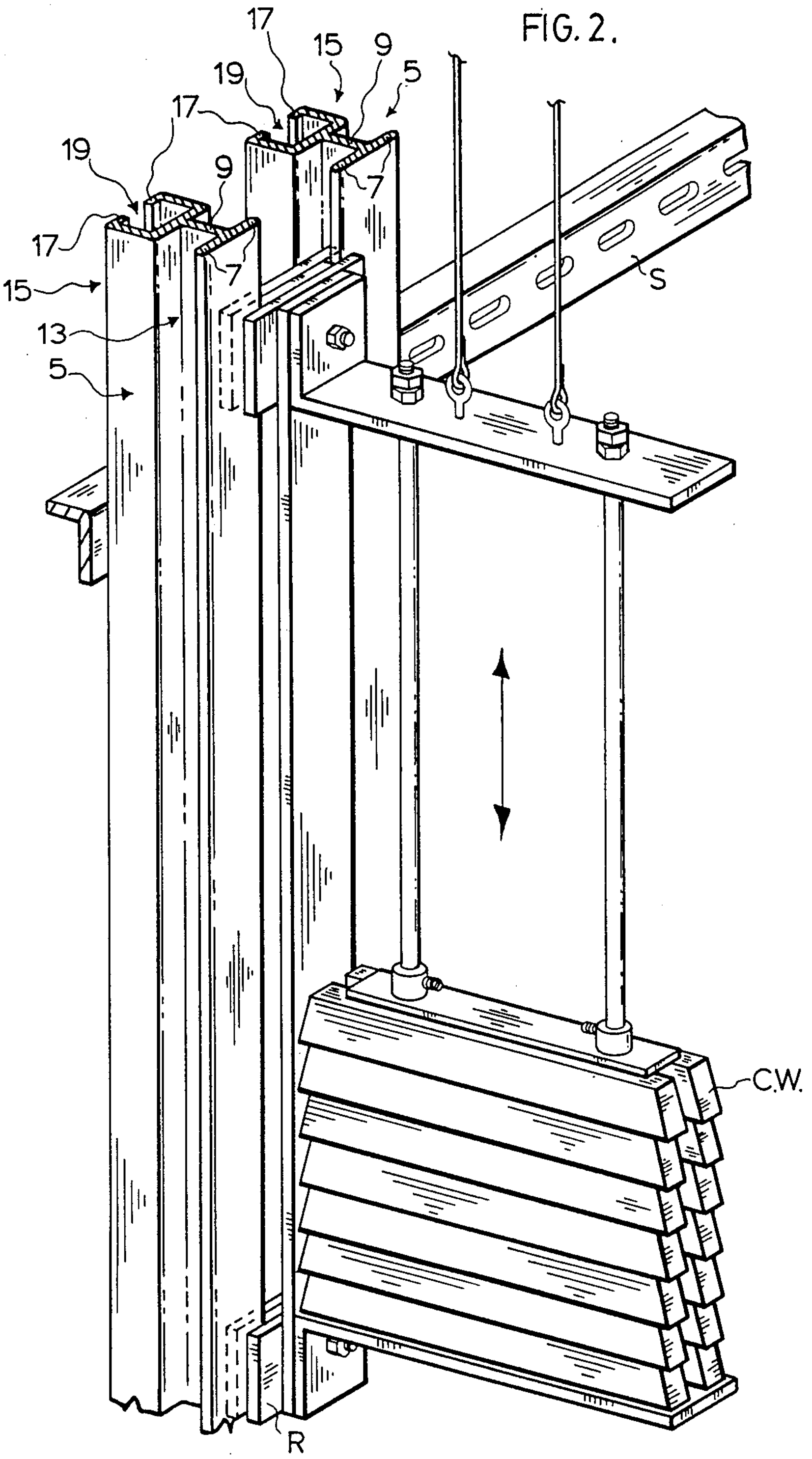
FIG. 2 is an enlarged perspective view showing the fitting of the counterweight to the structural member of FIG. 1.
Figure 3:
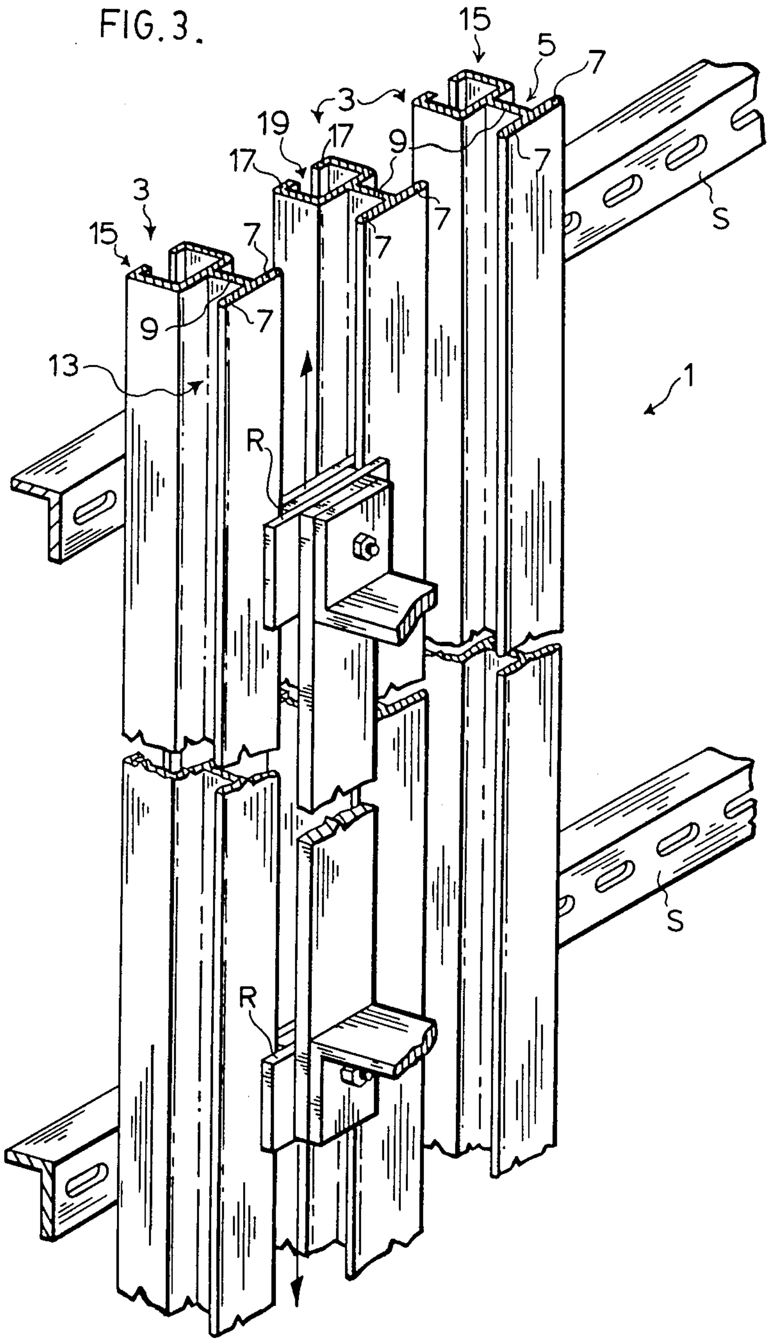
FIG. 3 is a further perspective view showing the actual mounting of the counterweight within the structural member of FIG. 2.

FIG. 1 shows a theatrical rigging assembly comprising a backdrop BD controlled through a series of pulleys and a counterweight CW for the backdrop. This counterweight is interfitted with a series of structural members generally indicated at 1 providing a guide for the counterweight. The individual structural members are indicated at 3 with a runner R for the counterweight being trapped between side by side structural members. As will be clearly seen in FIG. 1, these structural members, which are of substantial length, are held in a vertical plane by means of support rods S which are standard theatrical rigging construction.

The essence of the present invention lies in the construction of the individual structural or guide members 3 well shown in FIGS. 2 through 4 and 7 of the drawings.

More particularly, each of the members 3 comprises a forward guide component 5 and a rearward mount component 15 integrated with the forward component. The forward guide component has a T-like configuration comprising sideways extending flanges 7 secured to the rear component 15 through a center stem 9. Channels 13 are formed between the front flanges 7 and the rear mount component. The rear mount component has, as can be seen in the drawings, a hollow channel-like construction with a continuous slot 19 running completely along the length of the rear mount component and bordered to either side by inwardly directed leg portions 17 to define an undercut at the slot.

In summary, the preferred construction for each of the members 3 can be defined as a 'T' channel configuration.

As described above, the counterweight is provided with its own runner R. This runner fits between two adjacent guide members as best explained with reference to FIG. 7 of the drawings. In particular, the members 3 are set up side by side with one another with opposing flanges 7 in line at a spaced apart distance sufficient to trap the runner. Note that the stems 9 on each of the members 3 provides sufficient clearance at the channels 13 to allow the runner to travel up and down in each of the guide components of the individual structural members.

Figure 7:
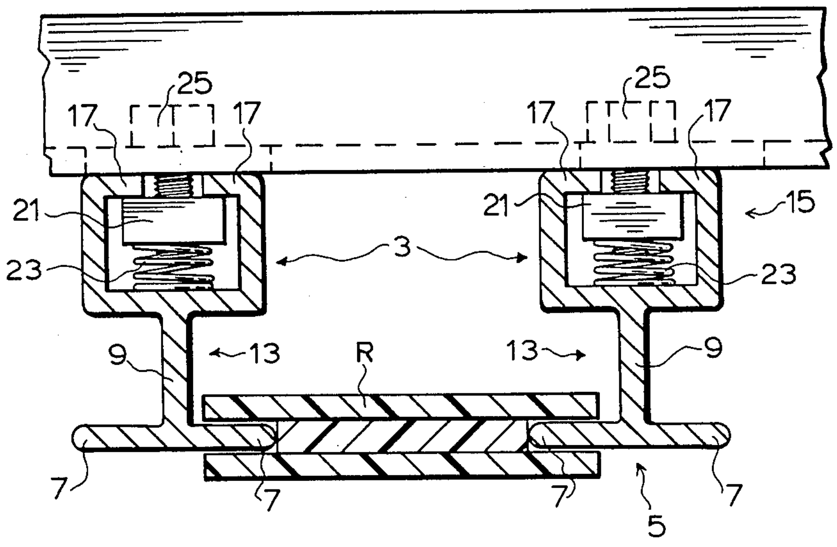
FIG. 7 is a sectional view looking down on side by side structural guide and mount members with a counterweight runner trapped between those two guide members.

Further note that in the arrangement as seen in FIG. 7, the two outside flanges 7 of the structural members will cooperate with further like structural members to be mounted in a similar manner for use with other counterweight runners.

The key to the present invention lies in the simplicity of mounting for each of the structural members through the channel-like backing or mount component 15. This mounting component, as earlier described, is hollow and has an undercut slot for receiving a spring-loaded nut and bolt combination slidable over the entire length of the structural member trapped within the mounting component. This avoids the necessity of having to drill at specified locations for fitting to the support rods and therefore substantially reduces all labour requirements in setting the system up.

A preferred embodiment securing member or nut and bolt combination is best seen in FIGS. 4 through 7 of the drawings. This combination comprises a nut 21 shaped to fit against rotation within the hollow mounting component 15. A helical open centred spring 23 is provided to the back of the nut forcing it to bind against undercut regions 17 on the mounting component. However, by pushing against the pressure from the spring, the nut can be slid to any desired position, ie. a position of alignment with the support rod from which the structural member is supported. Once properly located, a bolt 25 is fitted through the support rod and tightened to the nut 21 which then clamps the structural member at the undercut region 17 to the support rod.

As will be appreciated from the description immediately above, the only alignment required is that of simply sliding the nuts within the channel shaped mounting components and once slid to a proper position, the nuts are effectively locked in that position by means of the binding action caused by springs 23. Therefore, the structural members can be set up simply by measuring the height of the different support rods rather than having to first physically set up the structural members and then appropriately locate the nut and bolt combination, as is the case with prior art arrangements.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A theatrical rigging set up comprising a counterweight for a theatrical backdrop, said counterweight having a runner and said set up including a pair of side by side structural members in an upright position and between which said runner is slideably trapped, each of said structural members comprising a rearward hollow mounting component with an axially extending undercut slot for receiving securing means for securing said structural members in said upright position and said structural members each having a centrally located stem extending forwardly from and supporting a sideways extending flange outwardly off of said mounting component to define a pair of spaced apart facing channels one on each structural member, said spaced apart facing channels and the sideways extending flanges on both of said structural members cooperatively forming a guide for said runner.

2. A theatrical rigging set up as claimed in claim 1, wherein said stem and said sideways extending flange on each of said structural members has a T-like configuration whereby each of said structural members includes two of said channels, one to either side of said stem, one of said two channels forming part of said guide for said runner, the other of said two channels forming a further runner guide cooperatively with a further like upright supported structural member.

* * * * *